United States Patent [19]

Davidson et al.

[11] 4,083,621
[45] Apr. 11, 1978

[54] MULTIPLE SOCKET EXTENSION CORD

[76] Inventors: William C. Davidson, 5145 Mecca Ave., Tarzana, Calif. 91356; Robert W. Forsyth, 1517 N. 3rd Ave., Upland, Calif. 91786

[21] Appl. No.: 758,645

[22] Filed: Jan. 12, 1977

[51] Int. Cl.² ...................... H01R 13/60; H01R 39/02
[52] U.S. Cl. .............................. 339/119 C; 339/5 RL; 339/8 RL; 339/121
[58] Field of Search ..................... 339/1 R, 2 R, 2 RL, 339/5 RL, 6 RL, 8 R, 8 RL, 108 R, 119 C, 121

[56] References Cited

U.S. PATENT DOCUMENTS

| | | | |
|---|---|---|---|
| 1,153,829 | 9/1915 | Rueckert | 339/5 RL |
| 1,277,582 | 9/1918 | Heim | 339/8 R X |

FOREIGN PATENT DOCUMENTS

| | | | |
|---|---|---|---|
| 781,555 | 8/1957 | United Kingdom | 339/8 RL |

Primary Examiner—Joseph H. McGlynn
Assistant Examiner—E. F. Desmond
Attorney, Agent, or Firm—Roger A. Marrs

[57] ABSTRACT

An extension cord apparatus is disclosed herein having a length of electrical cord with a plug attached at one end and plurality of electrical sockets attached at the oposite end. The length of cord is trained about the body or core of a reel rotatably mounted on a supporting frame. The sockets or receptacles are carried in a box mounted on the end of a spindle forming a part of the reel and a cover is pivotally attached to the box constituting a handle when extended outwardly from the box for the purpose of winding the length of cord onto the reel from its extended position. A guide and strain relief for the cord is carried on the frame as well as a handle for transporting the apparatus from place to place.

9 Claims, 6 Drawing Figures

MULTIPLE SOCKET EXTENSION CORD

BACKGROUND OF THE INVENTION

1. Field of the Invention

This invention relates to multiple socket extension cords and more particularly to a novel extension cord carried on a wind-up reel for storage and transport purposes.

2. Description of the Prior Art

In the past, it has been the conventional practice to provide a length of extension cord carrying a common socket having multiple receptacles for receiving the plugs from a plurality of electrical appliances. Difficulties and problems have been encountered with such multiple socket extension cords which stem from the fact that the cords are of a thickness which maintains a memory when bent or twisted and the length of cord is difficult to wind or fold over upon itself for storage or transportation purposes. After short time usage, the wire has a tendency to kink and oftentimes, knots will occur when the user attempts to unravel the length of cord.

Some attempts have been made to obviate the coiling problem encountered with extension cords by providing a reel for storing the cord when not in use. In other instances, such as in the field of vacuum cleaners, the appliance includes a re-coil mechanism which usually incorporates a spring for automatically drawing the length of cord into a receptacle which automatically winds and stores the cord ready for future use. Although these prior devices have been operable for their intended purpose, defects have been found which stem largely from the fact that the operator or user of the device has no means for manually winding the length of cord onto a reel and most mechanisms do not include a strain relief or guide for controlling the winding operation. However, the employment of automatic retractable devices such as spring-loaded mechanisms is expensive and complicates the construction and operation of the total assemblage.

Therefore, a long standing need has arisen to provide a combination spool and reel assembly for storing a length of extension cord which includes means for manually retracting the length of cord onto the spool and which includes a plurality of electrical outlets for servicing a multiplicity of electrical appliances.

SUMMARY OF THE INVENTION

Accordingly, the above problems and difficulties are obviated by the present invention which provides an extension cord apparatus comprising a spool and reel assembly means for storing a length of extension cord attached at its opposite ends to a plurality of electrical outlets or sockets and an electrical plug respectively. The length of cord is trained about the spool or core of the reel assembly and the assembly is rotatably mounted on a supporting frame. The electrical outlet sockets are carried in a box mounted on the end of the spool or spindle forming a part of the reel assembly and is intended to rotate therewith. The box includes a pivotally mounted cover constituting a handle when extended outwardly from the box to accomodate hand winding of the length of cord onto the reel from an extended condition. Preferably, the frame includes a guide and strain relief means for the cord and preferably includes a handle for transporting the apparatus from one place to another.

Therefore, it is among the primary objects of the present invention to provide a novel electrical extension cord apparatus having a plurality of electrical outlets carried on the end of the cord and mounted in a box serving as a handle for winding the cord onto a reel assembly.

Another object of the present invention is to provide a novel extension cord reel assembly and storage device wherein the cord includes a plurality of outlet sockets carried in a box having a cover operable for effectively winding a reel assembly so that the cord is carried thereon for storage and transportation purposes.

Another object of the present invention is to provide a novel extension cord apparatus including a frame rotatably carrying a reel assembly for winding and unwinding the cord and which includes a handle for transporting the apparatus and a guide and strain relief means for the protection of the apparatus.

Still a further object of the present invention resides in a novel electrical extension cord apparatus having a unique handle means for winding the extension cord length onto a reel assembly.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF PREFERRED EMBODIMENT

Figure 1:
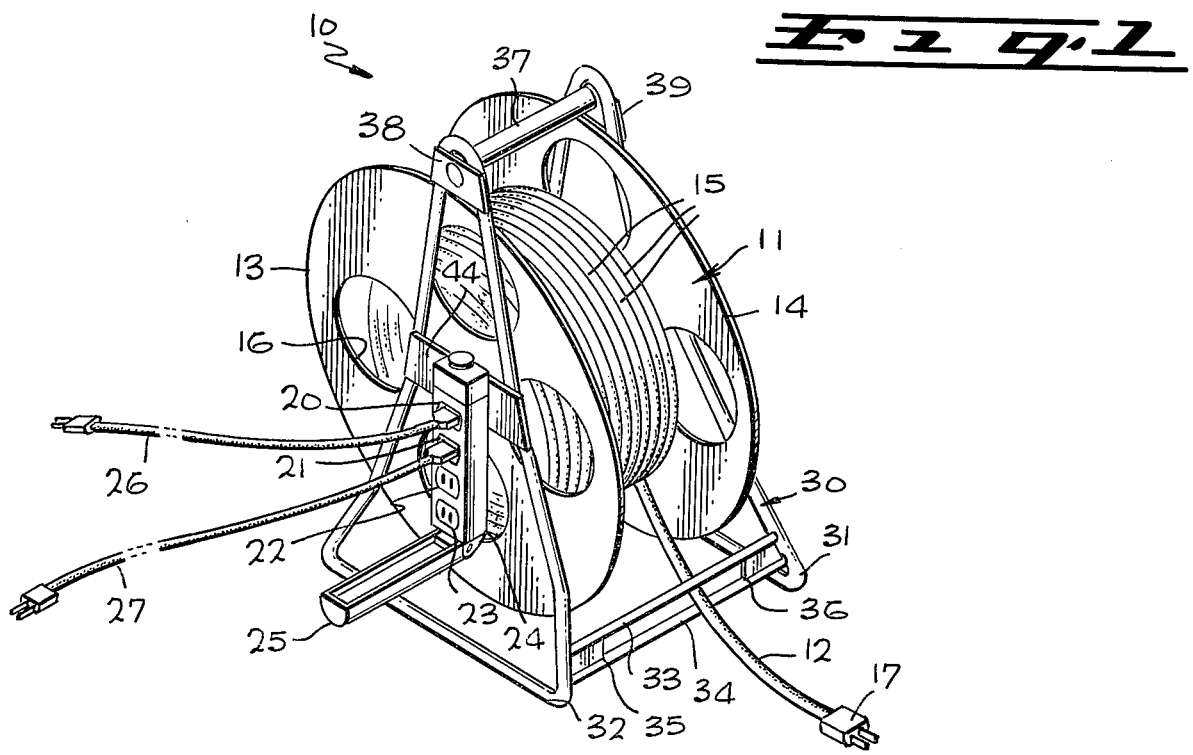
FIG. 1 is a front perspective view showing the novel extension cord apparatus of the present invention incorporating the novel handle means therefore.

Referring to FIG. 1, the novel electrical cord apparatus of the present invention is illustrated in the direction of arrow 10 which includes a spool and reel assembly 11 for storing a length of electrical cord illustrated by numeral 12. The cord 12 is wound between the sides 13 and 14 of the reel and is indicated by a plurality of coils identified by numeral 15. The sides 13 and 14 are preferrably formed with a plurality of openings or holes, such as opening 16 which constitutes lightening holes to reduce weight of the unit or apparatus.

One end of the extension cord 12 is provided with a conventional electrical plug 17 intended to be received into an electrical outlet connected to a power source such as a conventional power line. The opposite end of the cord 12 is connected to a plurality of electrical outlets or sockets indicated by the numerals 20-23 respectively. The plurality of electrical outlets or sockets are carried in a box 24 which pivotally supports a combined crank handle and outlet cover 25. As illustrated, the cover 25 has been pivoted downwardly to expose the outlets 20-23 so that they are available for usage. As illustrated, the uppermost outlets or sockets 20 and 21 are in use by electrical plugs attached to wires 26 and 27 connected to appropriate electrical appliances (not shown). The spool and reel assembly is rotatably carried on a frame 30 having a pair of sides composed of a tubular construction incorporating a tubular base 31 and 32. The base members 31 and 32 of the frame sides are connected together at the bottom by means of a pair of tubes 33 and 34 which are arranged in fixed spaced apart relationship so as to define an opening through which the cord 12 is trained. The opening between the rods 33 and 34 constitutes a strain relief and guide means whereby the plug 17 is of greater thickness than the opening and cannot travel therebetween. Brackets or gussets 35 and 36 serve to support the frame and the guide and strain relief means. The upper part of the frame is connected together by means of a handle 37 extending between a pair of retaining plates 38 and 39 which are secured to the sides of the frame 30.

Figure 2:
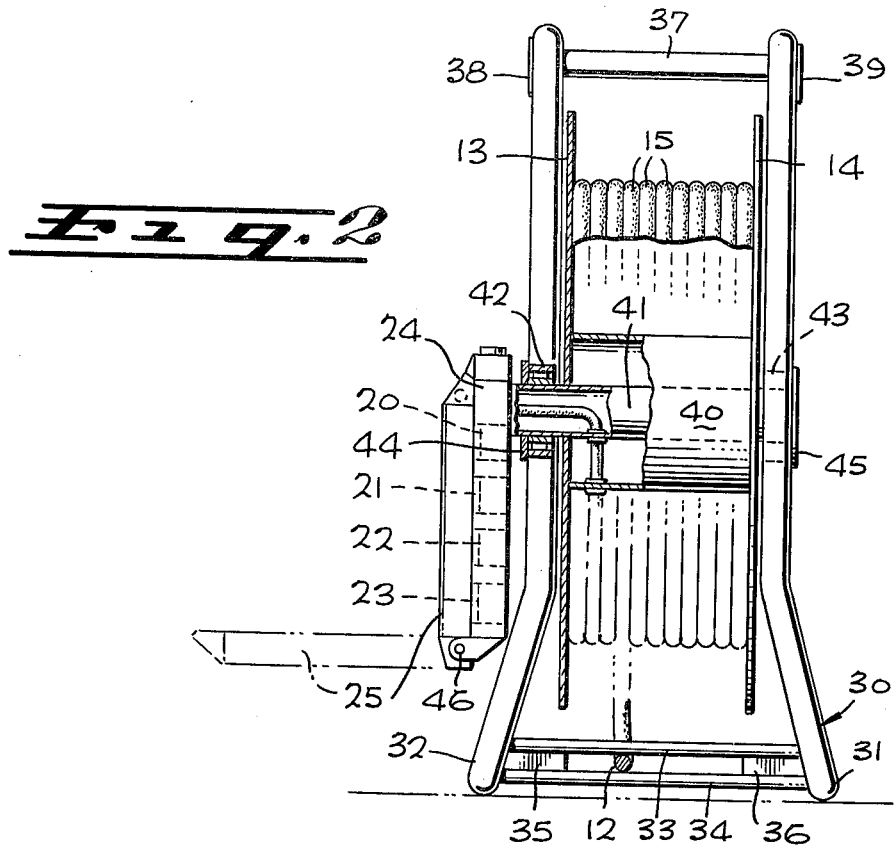
FIG. 2 is a front elevational view showing the extension cord apparatus of FIG. 1 and having a portion broken away to expose the internal elements and construction thereof.

Referring now in detail to FIG. 2, it can be seen that the spool and reel assembly 11 includes a core or body 40 on which the plurality of extension cord coils 15 are wound. Within the core 40, there is a spindle 41 which is coaxially disposed therewith and which has its opposite ends mounted through bearings 42 and 43 carried on brackets 44 and 45 secured to the outside of the tubular construction of the sides of frame 30. By this means, the spool and reel assembly is rotatably carried between the frame sides and a portion of the spindle 41 projects outward from one side so as to mount the box 24 thereon. It can be seen that the cord 12 passes through an aperture in the body 40 and a coaxial aperture in the spindle 41 wherein the cord travels through the interior of the spindle for termination at the respective and aforementioned electrical outlets 20-23 inclusive. The cover 25 is illustrated as covering the sockets in solid lines whereas the cover is illustrated in its handle cranking position in broken lines when pivoted about the pivot 46. Since the extension cord is secured to the box 24 via the sockets as the handle is cranked, the spindle 41 will rotate and draw the extension cord 12 onto the body or core 40 so as to form the coils 15. When it is desired to unwind the device, the cord 12 is pulled and the reel assembly will unwind accordingly.

If desired, a light may be incorporated onto the box 24 which will illuminate the outlet sockets for easier use. Also, a fuse and fuse holder may also be incorporated into the box 24 and operably connected to the respective outlets or sockets 20-23 respectively.

Figure 3:
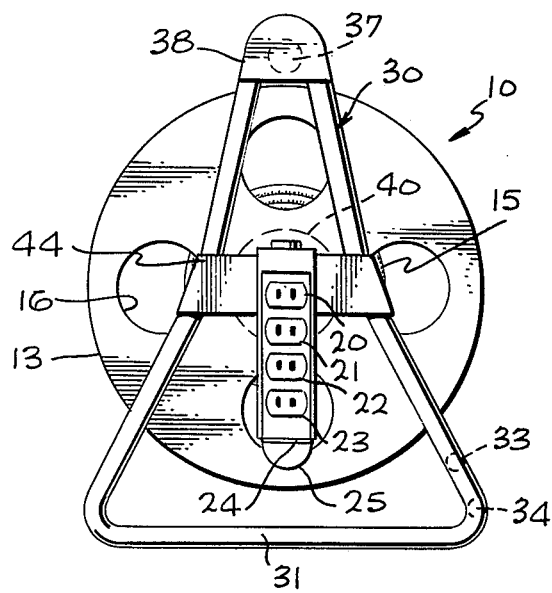
FIG. 3 is a side elevational view of the apparatus shown in FIGS. 1 and 2.

Referring now to FIG. 3, a side elevational view of the invention is illustrated wherein it can be seen that the box 24 is mounted exteriorly of the frame 30 on the projecting end of the spindle or shaft 41 outside of plate or bracket 44.

Referring now to FIG. 3, a side elevational view of the invention shown in FIGS. 1 and 2 is illustrated. It can be seen that the box 24 is located outside of the plate 44 and that the handle 25 has been pivoted downwardly so as to expose the electrical outlets for use. Also, it is to be noted that the frame 30 is narrow at the top and that the tubes forming the sides of the frame diverge outwardly to the base 31 so that the device is adequately supported. Therefore, the frame 30 is of a general triangular shape from side elevation.

Figure 4:
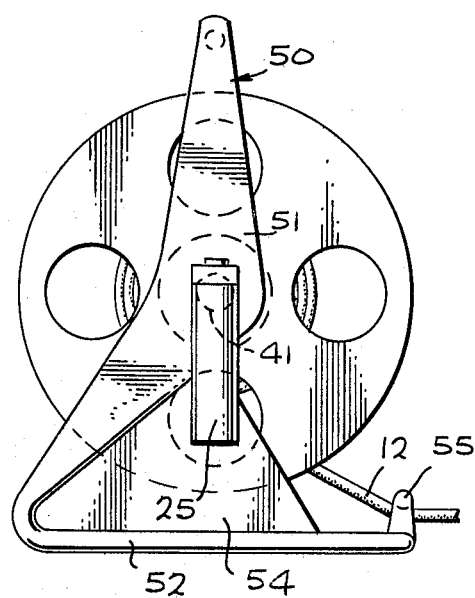
FIG. 4 is a side elevational view of still another embodiment of the present invention.

Referring now to FIG. 4, another embodiment of the invention is shown wherein the frame has taken a different form from the frame 30 shown in the previous views. In FIG. 4, the frame is represented by numeral 50 and includes an upper member 51 which is of a broad flat configuration to the bearing for supporting the shaft 41 and then the frame diverges towards a base 52 via a tapered plate 53. In this manner, the frame 50 may be said to cantilever from the base. If desired, a support gusset 54 may be employed between the plate 53 and the base 52. Furthermore, the base may include a strain relief and guide means for the cord 12 as indicated by the numeral 55. In this view, the handle 25 has been pivoted to its upward position so that it covers the receptacles 20-23 inclusive.

Figure 5:
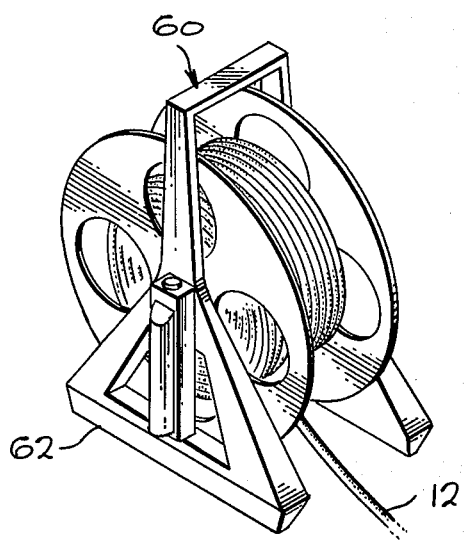
FIG. 5 is another version of the present invention showing a different frame.
Figure 6:
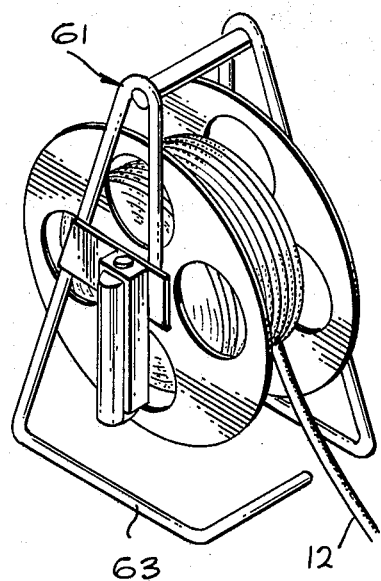
FIG. 6 is still a further version showing a different frame for the apparatus than the frames shown in FIGS. 1-5 respectively.

In FIGS. 5 and 6, other versions of frames are illustrated by numerals 60 and 61 respectively. Both of the bases 62 and 63 of the frame are wider at their bottoms than at the top. The top of the frames include handles as previously described and the reel assemblies are identical to the previous described spool and reel assembly. The cover 25 is pivoted to its upper position serving to enclose the electrical outlets. However, it is to be understood that the cover may be pivoted downward and may be operated as a crank handle to turn the spool and reel assembly for winding the electrical cord 12 onto the reel.

In view of the foregoing, it can be seen that the apparatus of the present invention provides a novel means for storing and transporting a length of electrical cord. A plurality of electrical outlets or sockets are carried on the apparatus and made available at a work site so that a plurality of electrical appliances may be electrically connected thereto. The device includes a strain relief so that the plug of the cord will not be pulled onto the reel and will not flay about once the length of the cord has been stored or coiled onto the reel assembly. A feature resides in providing a crank handle which also serves as a cover for the sockets. Although a variety of frames have been disclosed, all of the frames are of a basic triangular configuration when viewed in side elevation and the apex of the triangle forms a handle so that the user may carry the apparatus about. The preferred embodiment of the invention employs a three wire extension cord with one of the wires grounded to the box 24 for safety purposes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An electrical extension cord apparatus comprising: a frame;
 a reel assembly rotably carried on said frame;
 an electrical extension cord adapted to be coiled on said reel assembly;
 a plurality of electrical outlets carried on said reel assembly and arranged to rotate therewith; and
 handle means carried on said reel assembly for manually rotating said reel assembly for coiling said extension cord thereon, wherein said handle means includes a box carried on said reel assembly and mounting said electrical outlets thereon.

2. The invention as defined in claim 1 wherein said handle means further includes a cover pivotally attached to the bottom of said box constituting a crank handle in an outwardly pivoted position for grasping by the user and a cover for said plurality of outlets in an inwardly pivoted position with respect to said box.

3. The invention as defined in claim 2 wherein said frame includes an extension cord guide and strain relief means.

4. The invention as defined in claim 3 wherein said extension cord is provided with an electrical plug on one end and connected to said plurality of electrical outlets on its opposite end.

5. The invention as defined in claim 4 wherein said cord guide includes a pair of spaced apart rods accommodating passage of said extension cord, but not said electrical plug.

6. The invention as defined in claim 1 wherein
    said extension cord is connected to said electrical outlets on one of its opposite ends and connected to an electrical plug on the other end;
    said handle means includes a box enclosing said electrical outlets and further including a cover for said box pivotally carried thereon having an outwardly projecting, open position and an inwardly closed position; and
    said cover constituting a crank handle in its first position for winding said reel assembly coiling said extension cord and constituting a lid for said box covering said electrical outlets in its second position.

7. The invention as defined in claim 6 wherein said frame is of a substantially triangular configuration in side elevation so that the base thereof supports said apparatus and a hand grip secured to the apex thereof for hand carrying said apparatus from place to place.

8. The invention as defined in claim 7 wherein said reel assembly includes:
    a spool for supporting coils of wound extension cord and a shaft having an end portion projecting outwardly beyond the side of said frame; and
    said box secured to said shaft end portion so as to rotate said spool in response to rotation of said crank handle.

9. The invention as defined in claim 8 wherein said frame includes:
    a pair of plates carried on the sides of said frame;
    a bearing carried on each of said plates and coaxially disposed with respect to each other for rotatably supporting said shaft.

* * * * *